United States Patent
Faller

(10) Patent No.: US 12,012,118 B2
(45) Date of Patent: Jun. 18, 2024

(54) GENERATING TRAINING DATASETS FOR TRAINING MACHINE LEARNING BASED MODELS FOR PREDICTING BEHAVIOR OF TRAFFIC ENTITIES FOR NAVIGATING AUTONOMOUS VEHICLES

(71) Applicant: Perceptive Automata Inc., Boston, MA (US)

(72) Inventor: Avery Wagner Faller, Boston, MA (US)

(73) Assignee: Perceptive Automata, Inc., Boston, MA (US)

( * ) Notice: Subject to any disclaimer, the term of this patent is extended or adjusted under 35 U.S.C. 154(b) by 277 days.

(21) Appl. No.: 17/081,202

(22) Filed: Oct. 27, 2020

(65) Prior Publication Data

US 2021/0133500 A1 May 6, 2021

Related U.S. Application Data

(60) Provisional application No. 62/929,806, filed on Nov. 2, 2019.

(51) Int. Cl.
*G06V 40/00* (2022.01)
*B60W 30/095* (2012.01)
(Continued)

(52) U.S. Cl.
CPC ...... *B60W 60/001* (2020.02); *B60W 30/0956* (2013.01); *G06F 18/214* (2023.01);
(Continued)

(58) Field of Classification Search
CPC ........ G06V 20/46; G06V 20/48; G06V 20/58; G06V 40/20; G06V 10/774;
(Continued)

(56) References Cited

U.S. PATENT DOCUMENTS 7,269,516 B2 9/2007 Brunner et al.
8,175,333 B2 5/2012 Eaton et al.
(Continued)

OTHER PUBLICATIONS

O. Styles, A. Ross and V. Sanchez, "Forecasting Pedestrian Trajectory with Machine-Annotated Training Data," 2019 IEEE Intelligent Vehicles Symposium (IV), 2019, pp. 716-721, doi: 10.1109/IVS.2019.8814207. (Year: 2019).*

(Continued)

*Primary Examiner* — Molly Wilburn
*Assistant Examiner* — Ahmed A Nasher
(74) *Attorney, Agent, or Firm* — Fenwick & West LLP

(57) ABSTRACT

A vehicle collects video data of an environment surrounding the vehicle including traffic entities, e.g., pedestrians, bicyclists, or other vehicles. The captured video data is sampled and the sampled video frames are presented to users to provide input on a traffic entity's state of mind. The system determines an attribute value that describes a statistical distribution of user responses for the traffic entity. If the attribute for a sampled video frame is within a threshold of the attribute of another video frame, the system interpolates attribute for a third video frame between the two sampled video frames. Otherwise, the system requests further user input for a video frame captured between the two sampled video frames. The interpolated and/or user based attributes are used to train a machine learning based model that predicts a hidden context of the traffic entity. The trained model is used for navigation of autonomous vehicles.

20 Claims, 8 Drawing Sheets

(51) Int. Cl.
*B60W 60/00* (2020.01)
*G06F 18/214* (2023.01)
*G06N 20/00* (2019.01)
*G06V 10/774* (2022.01)
*G06V 10/778* (2022.01)
*G06V 20/40* (2022.01)
*G06V 20/58* (2022.01)
*G06V 40/20* (2022.01)

(52) U.S. Cl.
CPC ........... *G06N 20/00* (2019.01); *G06V 10/774* (2022.01); *G06V 10/7788* (2022.01); *G06V 20/46* (2022.01); *G06V 20/48* (2022.01); *G06V 20/58* (2022.01); *G06V 40/20* (2022.01); *B60W 2420/403* (2013.01)

(58) Field of Classification Search
CPC .......... G06V 10/7788; B60W 30/0956; B60W 60/001; B60W 2420/42; G06K 9/6256; G06N 3/0454; G06N 3/084; G06N 5/003; G06N 20/00
See application file for complete search history.

(56) References Cited

U.S. PATENT DOCUMENTS

| | | | |
|---|---|---|---|
| 8,854,457 | B2 | 10/2014 | De Vleeschouwer et al. |
| 9,881,221 | B2 | 1/2018 | Bala et al. |
| 10,186,123 | B2 | 1/2019 | Kanaujia et al. |
| 2015/0213555 | A1 | 7/2015 | Barfield, Jr. et al. |
| 2015/0316981 | A1* | 11/2015 | Sellen ................. G06V 40/193 345/156 |
| 2016/0358467 | A1* | 12/2016 | Jeong ............... G08G 1/096791 |
| 2017/0153639 | A1* | 6/2017 | Stein ..................... G08G 1/167 |
| 2017/0270374 | A1 | 9/2017 | Myers et al. |
| 2018/0146198 | A1 | 5/2018 | Atluru et al. |
| 2020/0247434 | A1* | 8/2020 | Kim .................. B60W 60/0017 |
| 2020/0265247 | A1* | 8/2020 | Musk .................... G06N 20/00 |

OTHER PUBLICATIONS

S. Schmidt, B. Färber, Pedestrians at the kerb—Recognising the action intentions of humans, Transportation Research Part F: Traffic Psychology and Behaviour, vol. 12, Issue 4, pp. 300-310, (Year: 2009).*
Girdhar, R. and Ramanan, D., "Attentional Pooling for Action Recognition," 31st Conference on Neural Information Processing Systems (NIPS 2017), 12 pages.
He, K., et al. "Mask R-CNN," Computer Vision and Pattern Recognition 1703.06870v3, Jan. 24, 2018, 12 pages.
International Search Report and Written Opinion, PCT Application No. PCT/US2018/063459, dated Feb. 7, 2019, 13 pages.
Karmarkar, T., "Regional Proposal network (RPN)—Backbone of Faster R-CNN," Aug. 18, 2018, 6 pages, [Online] [Retrieved Jan. 5, 2019], Retrieved from the internet <URL:https://medium.com/@tanaykarmarkar/region-proposal-network-rpn-bac>.
Kotseruba, I., et al., Joint Attention in Autonomous Driving (JADD), Robotics 1609.04741v5, Apr. 24, 2017, 10 pages.
Newell, A., et al., "Stacked Hourglass Networks for Human Pose Estimation," Computer Vision and Pattern Recognition 1603.06937v2, Jul. 26, 2016, 17 pages.
Ren, S. et al. "Faster R-CNN: Towards Real-Time Object Detection with Region Proposal Networks," Advances in Neural Information Processing Systems 28 (NIPS 2015), 9 pages.
Ren, S. et al. "Faster R-CNN: Towards Real-Time Object Detection with Region Proposal Networks," Computer Vision and Pattern Recognition 1506.01497v3, Jan. 6, 2016, 14 pages.
Santoro, A. et al., "A neural approach to relational reasoning," Jun. 6, 2017, 6 pages, [Online][Retrieved Jan. 5, 2019], Retrieved from the internet <URL:https://deepmind.com/blog/neural-approach-relational-reasoning/>.
Santoro, A. et al., "A simple neural network module for relational reasoning," Computation and Language 1706.01427, Jun. 5, 2017, 16 pages.
Schneemann, F., et al., "Context-based Detection of Pedestrian Crossing Intention for Autonomous Driving in Urban Environments," 2016 IEEE/RSJ International Conference on Intelligent Robots and Systems (IROS), Oct. 2016, 6 pages.
Watters, N., et al., " Visual Interaction Networks," Computer Vision and Pattern Recognition 1706.01433v1, Jun. 5, 2017, 14 pages.
Zhao, H., et al., "Pyramid Scheme Parsing Network," Computer Vision and Pattern Recognition 1612.01105v2, Apr. 27, 2017, 11 pages.

* cited by examiner

400

420

430

440

450
Number of Users

Likelihood of Crossing

460

470

GENERATING TRAINING DATASETS FOR TRAINING MACHINE LEARNING BASED MODELS FOR PREDICTING BEHAVIOR OF TRAFFIC ENTITIES FOR NAVIGATING AUTONOMOUS VEHICLES

CROSS-REFERENCE TO RELATED APPLICATION

This application claims the benefit of U.S. Provisional Application No. 62/929,806 filed Nov. 2, 2019, which is incorporated by reference in its entirety.

GOVERNMENT SUPPORT STATEMENT

This invention was made with government support under Award No. 1738479 awarded by National Science Foundation's Division of Industrial Innovation and Partnerships (IIP). The government has certain rights in the invention.

TECHNICAL FIELD

The disclosure relates in general to generating datasets for training machine learning based models that can be used in navigating autonomous vehicles and more specifically to generating dense training datasets for training machine learning based models that predict hidden contexts of traffic entities.

BACKGROUND

An autonomous vehicle uses different types of sensors to receive input describing the surroundings (or environment) of the autonomous vehicle while driving through traffic. For example, an autonomous vehicle may perceive the surroundings using camera images and lidar scans. The autonomous vehicle determines whether an object in the surroundings is stationary, for example, buildings or trees or the object is non-stationary, for example, a pedestrian, a vehicle, and so on. The autonomous vehicle system predicts the motion of non-stationary objects to make sure that the autonomous vehicle is able to navigate through non-stationary obstacles in the traffic.

Conventional systems predict motion of non-stationary objects using kinematics. For example, autonomous vehicles may rely on methods that make decisions on how to control the vehicles by predicting "motion vectors" of people near the vehicles. This is accomplished by collecting data of a person's current and past movements, determining a motion vector of the person at a current time based on these movements, and extrapolating a future motion vector representing the person's predicted motion at a future time based on the current motion vector. However, these techniques fail to predict motion of certain non-stationary objects for example, pedestrians, bicyclists, and so on. For example, if the autonomous vehicle detects a pedestrian standing in a street corner, the motion of the pedestrian does not help predict whether the pedestrian will cross the street or whether the pedestrian will remain standing on a street corner. Similarly, if the autonomous vehicle detects a bicyclist in a lane, the current motion of the bicycle does not help the autonomous vehicle predict whether the bicycle will change lanes. Failure of autonomous vehicles fail to accurately predict motion of non-stationary traffic objects results in unnatural movement of the autonomous vehicle, for example, as a result of the autonomous vehicle suddenly stopping due to a pedestrian moving in the road or the autonomous vehicle continuing to wait for a person to cross a street even if the person never intends to cross the street.

Machine learning based models, for example, neural networks are used for making various predictions to be able to navigate autonomous vehicles smoothly through traffic. The quality of these machine learning based models depends on the quality and the amount of training data used for training them. Current techniques for generating training data for training these machine learning based models require user input, for example, to generate labeled training datasets. However, obtaining large scale user input to build such a training dataset is time consuming, and expensive.

SUMMARY

A vehicle collects video data of an environment surrounding the vehicle using sensors, for example, cameras mounted on the vehicle. The video data comprises a sequence of video frames. The driving environment includes at least one traffic entity, such as a pedestrian, bicyclist, or another vehicle. A traffic entity is associated with a hidden context, for example, a state of mind of a pedestrian indicating an intention to cross a path of the vehicle or a measure of awareness of the vehicle. The captured video data is sampled to obtain a plurality of video frames. The system annotates each sampled video frame, each annotation specifying an attribute value describing a statistical distribution of user responses associated with a traffic entity displayed in the video frame. For example, the system presents a sampled video frame to a plurality of users and receives user responses describing a hidden context associated with a traffic entity displayed in the video frame. The system aggregates the user responses to determine the attribute value describing the statistical distribution of user responses for the traffic entity.

The system further annotates other video frames as follows. If the attribute value in a first sampled video frame is within a threshold of the attribute value of a second video frame, the system interpolates attribute values for a third video frame between the two sampled video frames. Otherwise, the system requests further user input for the third video frame captured between the two sampled video frames. The interpolated and/or user based attribute values are incorporated into a training dataset used to train a machine learning based model that predicts hidden context associated with traffic entities. The machine learning based model is provided to an autonomous vehicle and assists with navigation of the autonomous vehicle.

In an embodiment, the system identifies a second pair of video frames from the plurality of video frames. The second pair of video frames comprises a fourth video frame and a fifth video frame. The time of capture of the fourth video frame and the time of capture of the fifth video frame is separated by a second time interval. The system compares a fourth attribute value specified by the annotations of the fourth video frame and a fifth attribute value specified by the annotations of the fifth video frame. If the fourth attribute value is greater than the fifth attribute value by a threshold amount, the system identifies a sixth video frame having a time of capture within the second time interval and sends the identified sixth video frame to a plurality of users for annotating the sixth video frame. The system receives user responses associated with a hidden context associated with a traffic entity displayed in the identified video frame. The system annotates the sixth frame based on the user responses received from the plurality of users. The sixth video frame may be used for training a machine learning based model.

The process allows the system to select video frames that are sent to users for annotation so that video frames that have repetitive information have less chance of being sent to users to annotation and video frames that are more likely to improve the machine learning based model via training are sent to users for annotation. Since the number of video frames captured can be very large, the techniques disclosed allow effective and efficient annotation of video frames and efficient utilization of available resources used for annotation of video frames so that effective training data is generated for training of machine learning based models.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
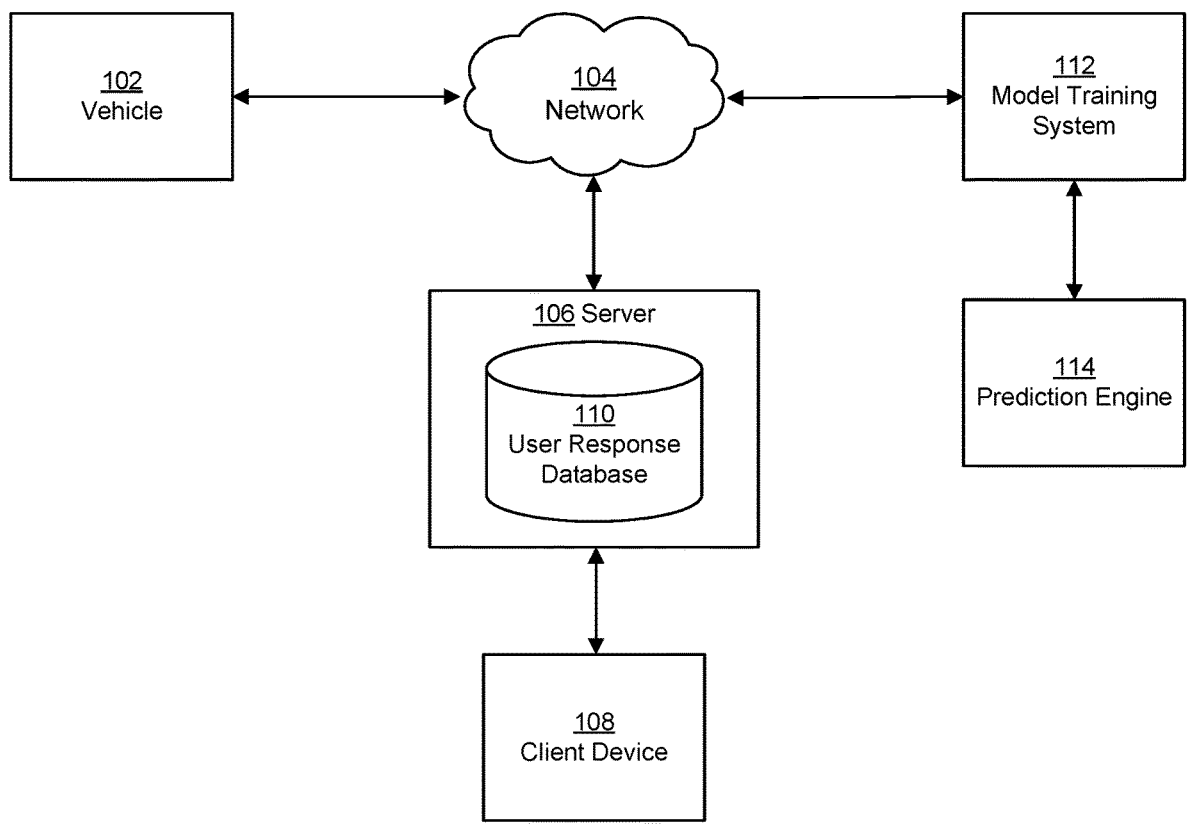
FIG. 1 shows an overall system environment illustrating a system that predicts a traffic entity's state of mind based on user input, in accordance with one or more embodiments.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

A busy driving environment may include a number of traffic entities, such as pedestrians, bicyclists, and other vehicles. For example, a pedestrian may decide to cross a busy street and a bicyclist may drive in a bike lane alongside vehicles. The traffic entities are associated with hidden context comprising attributes. The hidden context attributes, along with external factors such as road signs, traffic lights, and other traffic entities' actions, contribute to the decisions traffic entities make with regards to their visible actions and movements. Hidden context attributes are distinct from attributes that describe the movement, for example, motion vector of the traffic entity. Hidden context attributes describe a state of mind of a traffic entity. For example, a state of mind may include a measure of awareness of the vehicle in the mind of the traffic entity. The movement of the traffic entity is determined by the hidden context, for example, if the state of mind indicates that the user plans on crossing the street, the user is likely to move in front of the vehicle, even if the motion vector indicates otherwise. Unlike human drivers, autonomous vehicles lack the innate ability to judge intentions of traffic entities.

The system described herein presents video frames including activities of traffic entities to a set of users, who provide input on the traffic entities' behavior. The video frames may be from the point of view of the autonomous vehicle, such that the user input provides information on the traffic entity relative to the autonomous vehicle. For example, the set of users may provide responses to questions on how likely a traffic entity is to cross the path of the autonomous vehicle, direction in which the traffic entity is traveling, and how likely it is that the traffic entity is aware of the autonomous vehicle's presence, for example. The system annotates the video frames based on the user responses. For example, the system may determine values of one or more attributes that represents statistical distribution of the user responses describing the hidden context associated with traffic entity and annotate the video frame with the one or more attributes. The user responses are used to build a dataset that is used in training a plurality of machine learning based models. The machine learning based models take, as input, a set of video frames showing traffic entities, and provide output that predict a statistical distribution of user responses regarding the traffic entities' states of mind and actions, i.e., the traffic entities' behavior. The machine learning based model may be provided to an autonomous vehicle. The autonomous vehicle may use the predicted user distribution of the traffic entities' states of mind to assist in the navigation of the autonomous vehicle. In particular, the machine learning based model may assist with multi-object tracking, path planning, motion planning, and/or other navigation tasks relevant to the autonomous vehicle.

The video frames presented to users are sampled from a sequence of video frames, such that the user responses are received only for the samples video frames and not for every frame in the sequence. In such cases, the behavior of the traffic entity may differ greatly between a first frame shown to the user and a second frame shown to the user. The system generates more data on the behavior of the traffic entity between the first frame and the second frame, either via interpolation or seeking more user responses, to generate a denser dataset to train the machine learning based models with.

Systems and methods for predicting user interaction with vehicles are disclosed in the U.S. patent application Ser. No. 15/830,549, filed on Dec. 4, 2017, which is incorporated by reference herein in its entirely.

System Environment

FIG. 1 shows an overall system environment illustrating a system 100 that predicts hidden context describing traffic entities based on user input, in accordance with one or more embodiments. The system environment 100 includes a vehicle 102, a network 104, a server 106 which hosts a user response database 110, a client device 108, a model training system 112, and a prediction engine 114. The network 104 connects the vehicle 102 with the server 106 and the model training system 112.

The vehicle 102 may be any manual or motorized vehicle, such as a car, bus, or bicycle. In some embodiments, the vehicle 102 may be an autonomous vehicle. The vehicle 102 monitors its surrounding environment, capturing events in the surrounding environment through video data. For example, the vehicle 102 may include an image sensor, or a camera that records a sequence of video frames that capture activities in the surrounding environment. Data may be collected from cameras or other sensors including solid state Lidar, rotating Lidar, medium range radar, or others mounted on the car in either a fixed or temporary capacity and oriented such that they capture images of the road ahead, behind, and/or to the side of the car. In some embodiments, the sensor data is recorded on a physical storage medium such as a compact flash drive, hard drive, solid state drive or dedicated data logger. The video frames may include traffic entities and their actions, such as a pedestrian crossing a crosswalk in front of the vehicle 102, a bicyclist riding alongside the vehicle 102 in a bike lane, and other vehicles waiting to turn on to a cross street.

The network 104 may be any wired and/or wireless network capable of receiving sensor data collected by the vehicle 102 and distributing it to the server 106, the model training system 112, and, through the model training system 112, the prediction engine 114. In some embodiments, the network 104 may use standard communication protocols and comprise local area networks, wide area networks, or a combination thereof.

The server 106 may be any computer implemented system capable of hosting, providing content to users, and receiving input from users on the content. The content may include image, video, and text information. The server 106 provides the content to each of the users via the user's client device 108. The server 106 may present, to the users, the content and request input on the content. Users may be asked questions relating to hidden context of a traffic entity, for example, state of mind of an individual corresponding to a traffic entity to which the users can respond. In some embodiments, the users may respond by ranking how likely a state of mind is, using the Likert scale. For example, questions presented to the user may relate to how likely a traffic entity is to cross the path of the autonomous vehicle, the direction in which the traffic entity is traveling, and how likely it is that the traffic entity is aware of the autonomous vehicle's presence. The server 106 derives an annotation for the video frames shown to the users, wherein the annotation describes the statistical distribution of the user responses. In an embodiment, the statistical distribution comprises a mean value and standard deviation. Other embodiments may use other measures of statistical distribution, for example, any measurements of the central tendency of the distribution of scores like the mean, median, or mode. They could include measurements of the heterogeneity of the scores like variance, standard deviation, skew, kurtosis, heteroskedasticity, multimodality, or uniformness. They could also include summary statistics like those above calculated from the implicit measurements of the responses listed above.

The user responses are stored in the user response database 110. The server 106 may be capable of receiving content and sending data via the network 104, as well. For example, the server 106 receives the content from the vehicle 102, and provides data on the user responses to the model training system 112.

Each user provides input on the content presented by the server 106 via a client device 108. The client device 108 is a computing device capable of receiving user input, as well as transmitting and/or receiving data via the network 104. In some embodiments, the client device 108 may be a computer system, such as a desktop or a laptop computer. The client device 108 may also be a device with mobile device that enables the user to interact with the server 106.

The model training system 112 trains machine learning based models that predict the state of mind, including intentions and behavior, of traffic entities in areas surrounding the vehicle 102. Different machine learning techniques can be used to train the machine learning model including, but not limited to decision tree learning, association rule learning, artificial neural network learning, convolutional neural networks, deep learning, support vector machines (SVM), cluster analysis, Bayesian algorithms, regression algorithms, instance-based algorithms, and regularization algorithms. In some embodiments, the model training system 112 may withhold portions of the training dataset (e.g., 10% or 20% of full training dataset) and train a machine learning model on subsets of the training dataset. For example, the model training system 112 may train different machine learning models on different subsets of the training dataset for the purposes of performing cross-validation to further tune the parameters. In some embodiments, because candidate parameter values are selected based on historical datasets, the tuning of the candidate parameter values may be significantly more efficient in comparison to randomly identified (e.g., naïve parameter sweep) candidate parameters values. In other words, the model training system 112 can tune the candidate parameter values in less time and while consuming fewer computing resources.

The machine learning based models are trained using a process of progressively adjusting the parameters of model in response to the characteristics of the images and summary statistics given to it in the training phase to minimize the error in its predictions of the summary statistics for the training images. In one embodiment of the model training system 112, the algorithm can be a deep neural network. In this embodiment, the parameters are the weights attached to the connections between the artificial neurons comprising the network. Pixel data from an image in a training set collated with human observer summary statistics can serve as an input to the network. This input can be transformed according to a mathematical function by each of the artificial neurons, and then the transformed information can be transmitted from that artificial neuron to other artificial neurons in the neural network. The transmission between the first artificial neuron and the subsequent neurons can be modified by the weight parameters discussed above. In this embodiment, the neural network can be organized hierarchically such that the value of each input pixel can be transformed by independent layers (e.g., 10 to 20 layers) of artificial neurons, where the inputs for neurons at a given layer come from the previous layer, and all of the outputs for a neuron (and their associated weight parameters) go to the subsequent layer. At the end of the sequence of layers, in this embodiment, the network can produce numbers that are intended to match the human response statistics given at the input. The difference between the numbers that the network output and the human response statistics provided at the input comprises an error signal. An algorithm (e.g., backpropagation) can be used to assign a small portion of the responsibility for the error to each of the weight parameters in the network. The weight parameters can then be adjusted such that their estimated contribution to the overall error is reduced. This process can be repeated for each image (or for each combination of pixel data and human observer summary statistics) in the training set collected. At the end of this process the model is "trained", which in some embodiments, means that the difference between the summary statistics output by the neural network and the summary statistics calculated from the responses of the human observers is minimized.

Ultimately, predictions of a traffic entity's state of mind facilitate the navigation of autonomous vehicles, in particular with multi-object tracking, path planning, motion planning, and/or other navigation tasks relevant to the autonomous vehicle. The model training system 112 takes in the data on the user responses to video frames showing the activities of traffic entities, and models the statistical distribution of the user responses. In one embodiment, the model training system 112 receives image, video, and/or text information and accompanying user responses from the database 110 over the network 104. In some embodiments, the user responses may include discrete values of text or free text responses. The model training system 112 can use images, video segments and text segments as training examples to train an algorithm, and can create labels from the accompanying user responses based on the trained algorithm. These labels indicate how the algorithm predicts the behavior of the people in the associated image, video, and/or text segments. After the labels are created, the model training system 112 provides them to the prediction engine 114.

The prediction engine 114 outputs a predicted distribution of user responses associated with a video frame. The predicted distribution of user responses may include predictions on identified traffic entities and on the states of mind of the traffic entities. The model training system 121 may train an algorithm in the prediction engine 114. The output of the prediction engine 114 is used in facilitating the navigation of autonomous vehicles. For example, the output of the prediction engine 114 may be used to determine the control signals provided to a control system of the autonomous vehicle to navigate the autonomous vehicle including the accelerator, steering, braking system, and so on.

Figure 2:
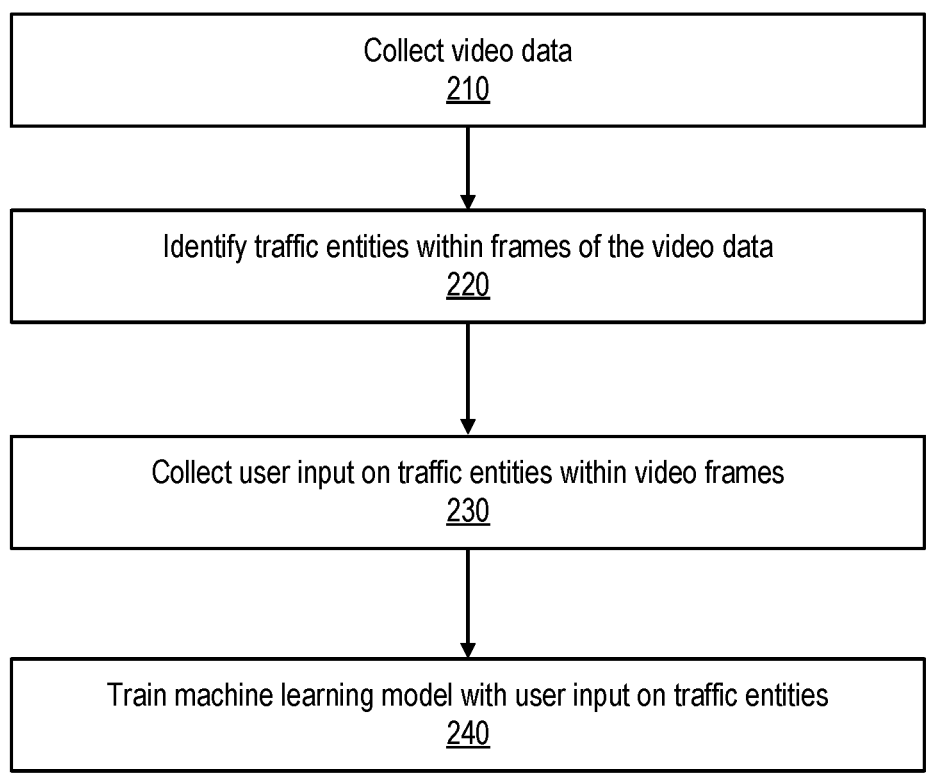
FIG. 2 is a flowchart illustrating a method for training, with user input, a machine learning model that predicts a traffic entity's state of mind, in accordance with one or more embodiments.

FIG. 2 is a flowchart illustrating a method 200 for training, with user input, a machine learning model that predicts a traffic entity's state of mind, in accordance with one or more embodiments.

A camera or another image sensor collects 210 video data of a driving environment. In some embodiments, the video data may be recorded from a vehicle (e.g., the vehicle 102). The video data comprises a plurality of video frames. The video frames may include traffic entities, such as pedestrians, bicyclists, and other motorized vehicles that are in the driving environment. The traffic entities may be stationary or moving in the video. The captured video data is sent to a server (e.g., the server 106) over a network (the network 104). In some embodiments, a plurality of sensors may collect sensor data, other than image data, about the driving environment about the vehicle. For example, the sensor data may include lidar and radar, among others.

The server provides the video frames to a prediction engine (e.g., the prediction engine 114) that identifies 220 the traffic entities within the video frames. The server subsequently presents the video frames to a plurality of users, each of whom access the video frames via a client device (e.g., the client device 108).

The server requests and collects 230 user inputs on each of the traffic entities within the video frames. The users may provide responses as to whether the prediction engine correctly identified each of the traffic entities, and if not, correctly identify the traffic entities. The users may also provide responses on a state of mind of each of the traffic entities. For example, the user may be asked how likely the traffic entity is to cross the path of the autonomous vehicle, the direction in which the traffic entity is traveling, and how likely it is that the traffic entity is aware of the autonomous vehicle's presence, among other questions on the traffic entity's behavior and intentions. In responding to the questions on the traffic entity's state of mind, the user may rank the likelihood of occurrence of a particular state of mind. For example, the user may rank, from a scale of one to five, how likely a person is to cross the street. A plurality of user responses may be aggregated to form a distribution of user responses relating to the traffic entity's activities.

A machine learning based model is trained 240 with the user input on the traffic entities in the video frames. The machine learning model may be trained by a model training system (e.g., the model training system 112). The trained model ultimately predicts, via a prediction engine (e.g., the prediction engine 114) a distribution of user responses about a traffic entity.

Annotating Between Sampled Video Frames

The quality of a machine learning based model largely depends on the quality and amount of training data used for training the machine learning based model. The training data used by the model training system 112 is generated from user responses to video frames. While user responses for all or most video frames would be ideal, video data may be so voluminous that requesting such large scale user input is impractical, considering the cost and time to do so. The system may sample frames from a large set of video data and request user input on the sampled frames. In cases where the sampled frames are not consecutive, the system interpolates in between the sampled frames to predict the distribution of user responses. The predicted user responses add to a training data set used to train the machine learning model that predicts traffic entity intentions, as described in FIG. 2.

Figure 3A:
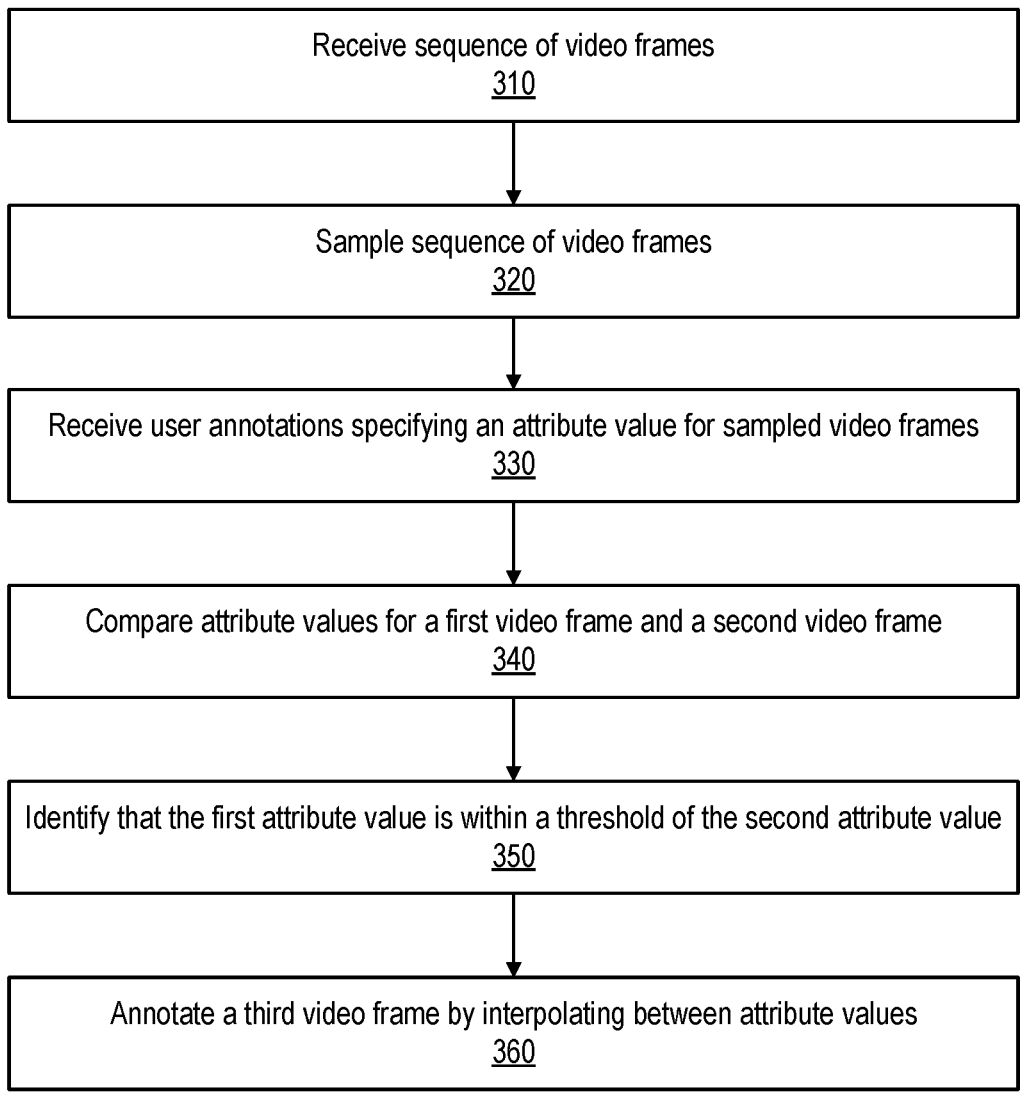
FIGS. 3A-B are flowcharts illustrating a method for generating, by interpolation, a dense training data set for training a machine learning model that predicts a traffic entity's state of mind, in accordance with one or more embodiments.
Figure 3B:
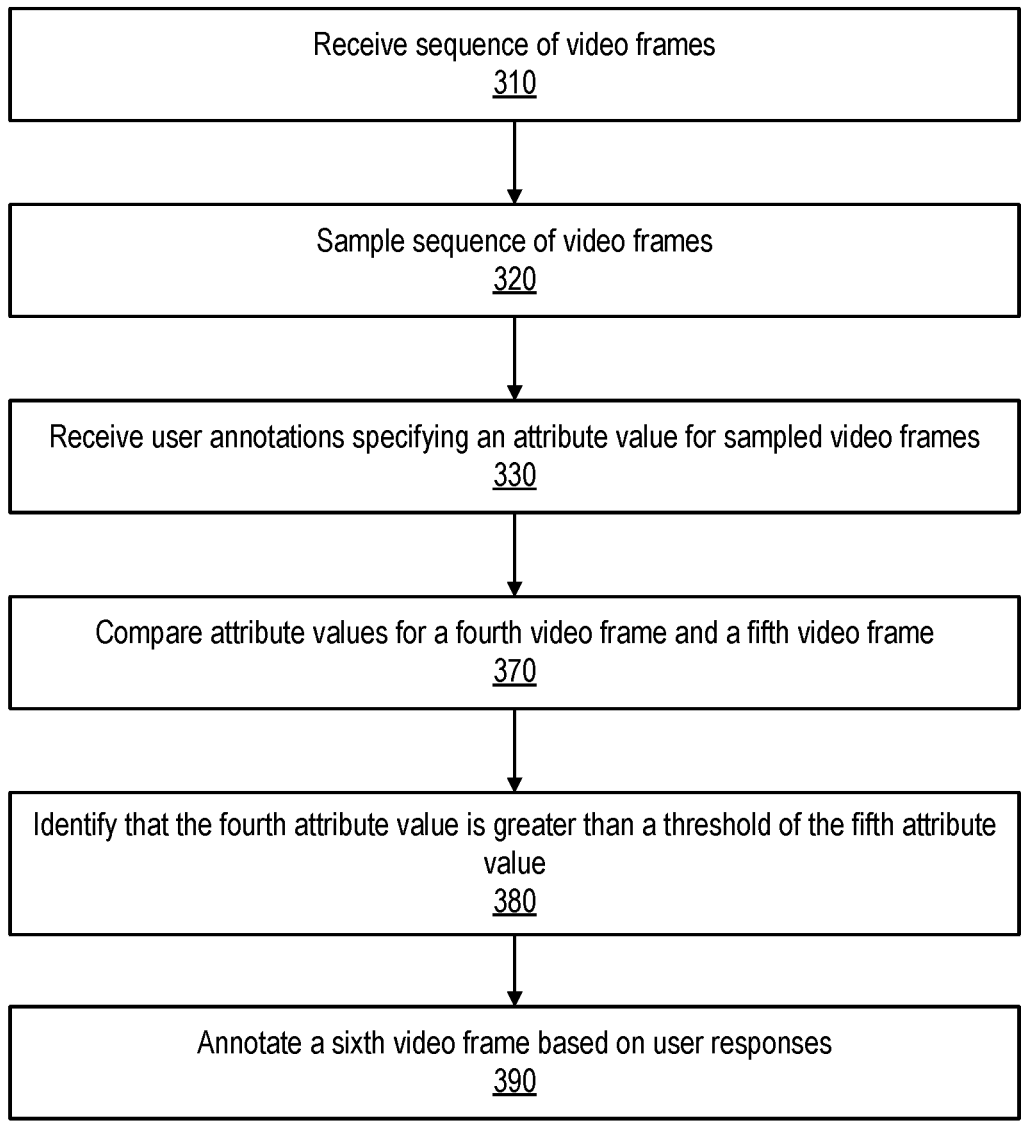

FIGS. 3A-3B are flowcharts illustrating a method 300 for generating, by interpolation, a dense training data set for training a machine learning model that predicts a traffic entity's state of mind, in accordance with one or more embodiments.

A server (e.g., the server 106) receives 310 a sequence of video frames capturing a driving environment. The server samples 320 the sequence of video frames to present to users a plurality of video frames, such that users do not provide input on all the video frames in the sequence. The video frames presented to the user may not be consecutive. For example, a first sampled video frame may capture a driving environment at 2:45 pm, while a second sampled video frame may capture the same driving environment on the same day, at 2:50 pm, leaving a five minute time interval in between the two sampled video frames. Similarly, the system may sample a fourth and fifth video frame, with a second time interval in between each one. Each of the video frames includes at least one traffic entity about which the user provides input.

Once the user is presented with the sampled video frames, the server receives 330 annotations from a set of users for each of the sampled video frame. Each annotation specifies an attribute value describing a statistical distribution of the set of user responses associated with a traffic entity in the sampled video frame. For example, an attribute value may indicate a statistical distribution of user responses indicating a likelihood, on a scale of one to five, that a traffic entity in a sampled video frame is aware of the vehicle (e.g., the vehicle 102) from which the video data was collected. The statistical distribution of user responses may be indicated by an attribute value via variance, standard deviation, interquartile range, or some combination thereof.

The system compares 340 attribute values for the first video frame and the second video frame. The first video frame and the second video frame are nonconsecutive, as mentioned above.

The system identifies 350 that the attribute value for the first video frame, i.e., the first attribute value, is within a threshold of the attribute value for the second video frame, i.e., the second attribute value. A first attribute value within the threshold of the second attribute value may indicate that the actions of the traffic entity may not differ greatly between the first The system annotates 360 a third video frame captured in the time interval between the first and the second video frames. The system interpolates between the first attribute value and the second attribute value to predict attribute values for the third video frame. The annotations for the third video frame indicate a predicted statistical distribution of user responses for a traffic entity in the third video frame.

In one embodiment, the following relationship between the time interval and the first and the second attribute values may determine how the system interpolates attribute values for the third video frame.

Suppose that the third video frame is captured in the time interval $[t_1, t_2]$, and that the system seeks to determine an attribute value at time $t_3$ within the time interval. The attribute value may depend on the difference between $t_3$, $t_1$, and $t_2$. For example, if $t_3-t_1 < t_2-t_3$, then the system may assign an attribute value at $t_3$ closer to the attribute value at $t_1$. Similarly, if $t_3-t_1 > t_2-t_3$, the system may assign an attribute value at $t_3$ closer to the attribute value at $t_2$. Accordingly, the system fits a linear function based on the attribute values at times t1 and t2 and uses the linear function to determine attribute values at various times in between t1 and t2. In other embodiments, the system may fit a higher order curve (for example, a parabolic curve) through attributes values corresponding to a set of time points.

In some cases, the attribute values may not be within the threshold, in which case the system may seek further user responses for the video frames.

The system compares 370 attribute values for the fourth video frame and the fifth video frame. The system identifies 380 that the fourth video frame's fourth attribute value differs more than a threshold of the fifth attribute value.

The system seeks further user responses for a sixth video frame captured in the second time interval between the fourth and fifth video frames. The sixth video frame is presented to the set of users, who provide input on a traffic entity in the video frame. Based on the user responses, the system annotates 390 the sixth video frame.

The system either interpolates and/or annotates each video frame based on the attribute values, thereby creating a denser dataset than provided by user responses.

FIGS. 4A-4D show example statistical distributions of user input about a traffic entity 405's state of mind, in accordance with one or more embodiments. FIGS. 4A-4D show a plurality of video frames 400, 420, 440, and 460 shown to a set of users. Each of the frames show the traffic entity 405 in a driving environment, and the users are requested to provide input on the traffic entity 405's actions and intentions. In particular, in FIGS. 4A-4D, the users are requested to provide a response as to the likelihood of the traffic entity 405 crossing a road in the driving environment that may be in the path of the vehicle capturing the video data. The user responses are scaled from one to five, indicating a likelihood ranging from very low to very high. The system aggregates a plurality of user responses to provide an attribute value that describes a statistical distribution of the users' responses for each video frame. In FIGS. 4A-4D, the attribute values may correspond to the statistical distribution of user response shown in plots 410, 430, 450, and 470. While FIGS. 4A-4D show user input on the likelihood of the traffic entity 405's crossing the road in each corresponding video frame, the user input may also indicate a measure of awareness of a vehicle around them.

Figure 4A:
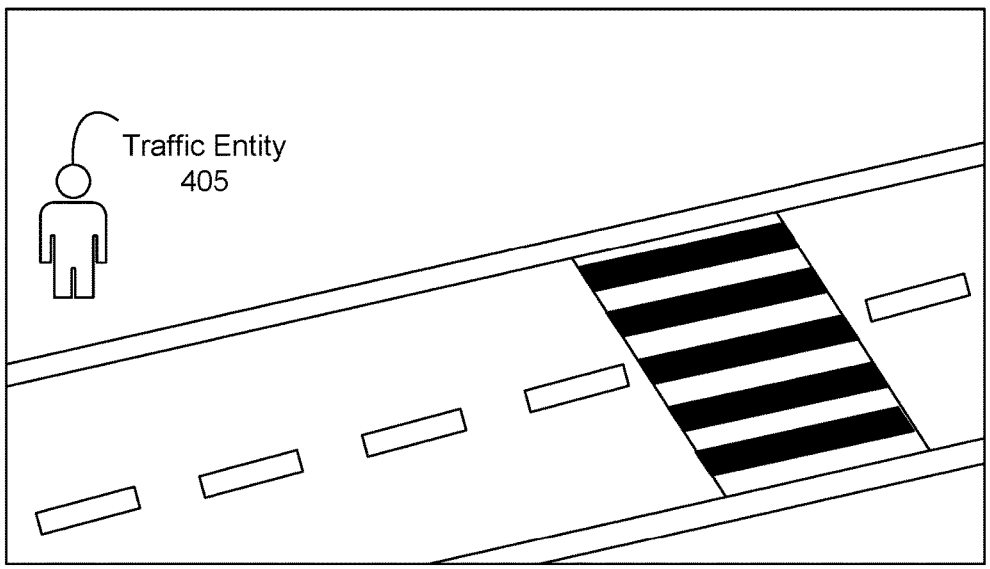
FIGS. 4A-4D show example statistical distributions of user input about a traffic entity's state of mind, in accordance with one or more embodiments.
Figure 4A:
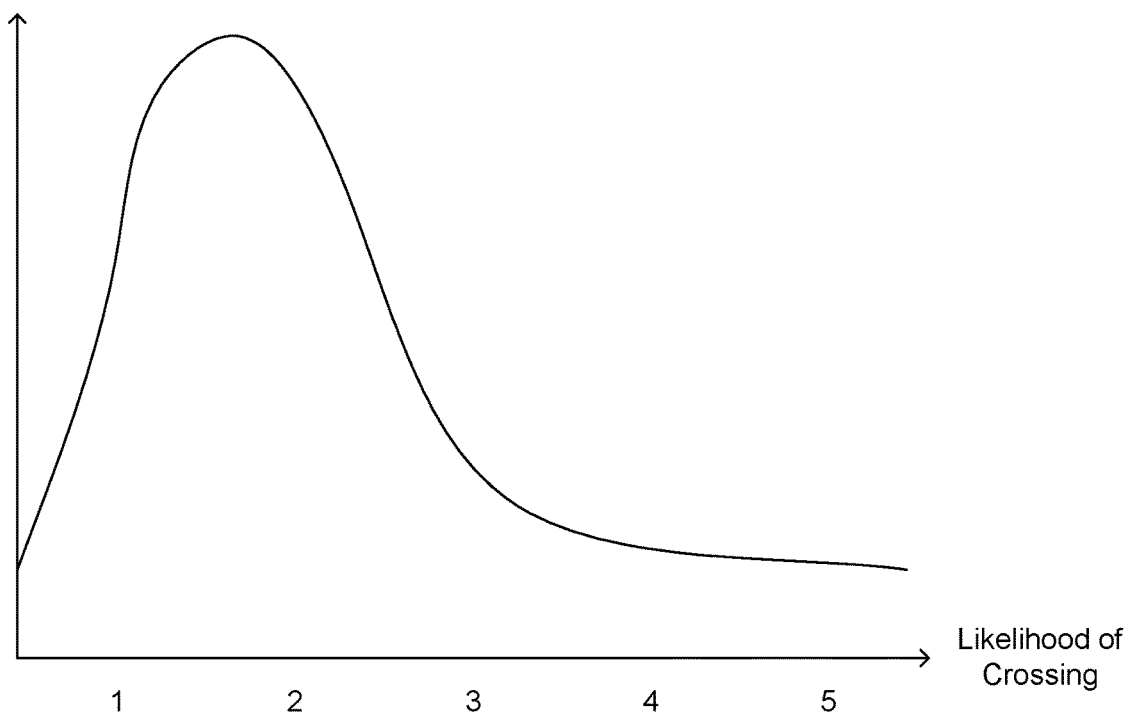

In FIG. 4A, the plot 410 describes the statistical distribution of user responses for the video frame 400. The plot 410 suggests that most users believe that the traffic entity 405 has a low likelihood of crossing the street.

Figure 4B:
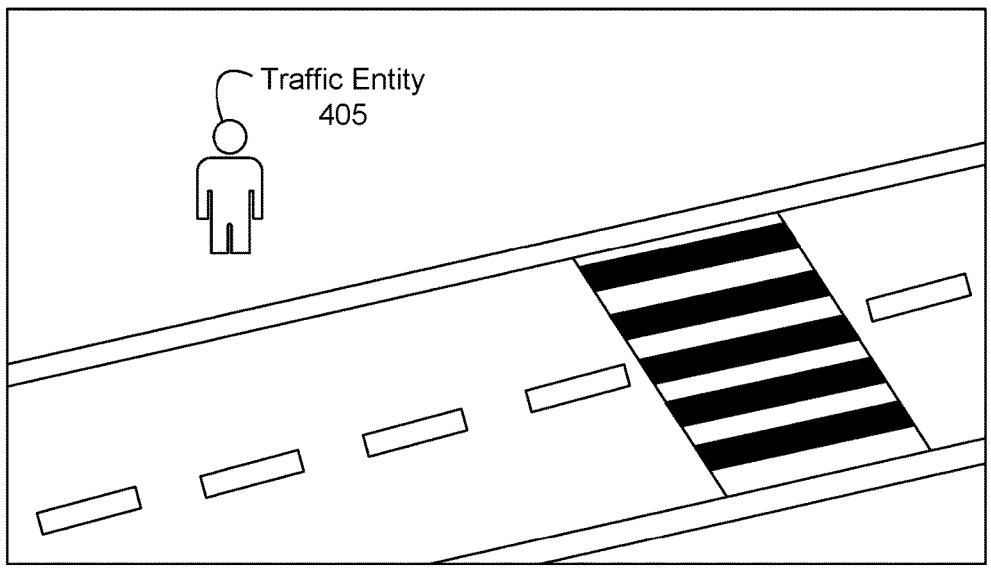
Figure 4B:
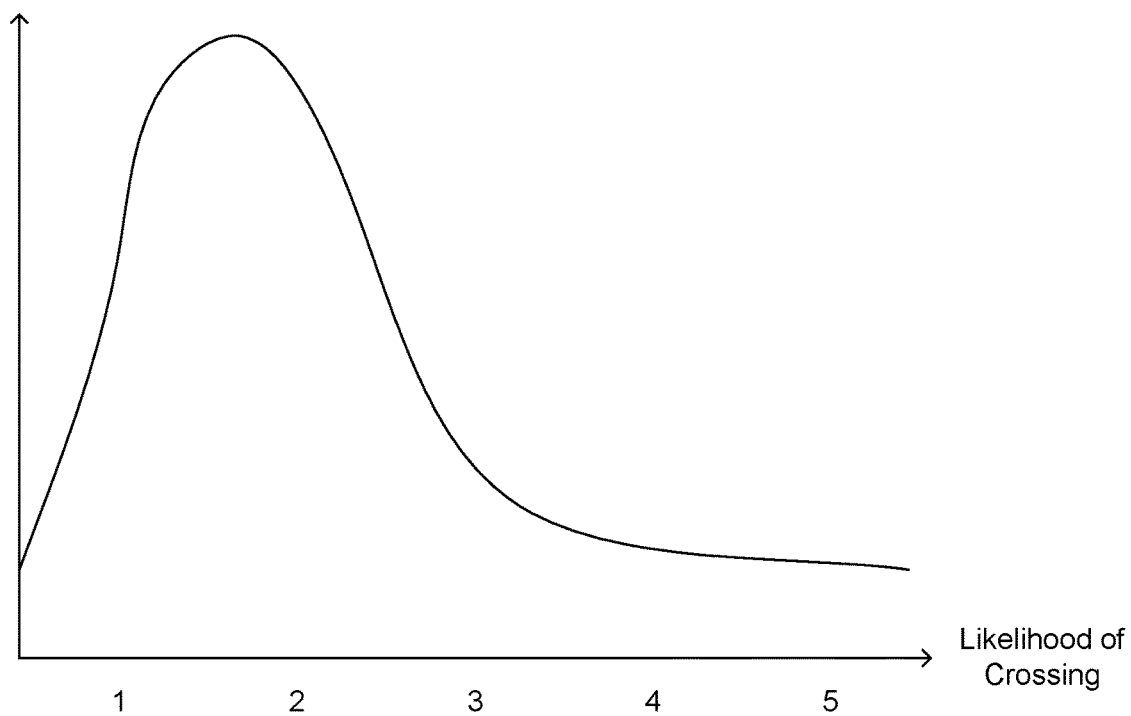

In FIG. 4B, users are presented the video frame 420, in which the traffic entity 405 has moved slightly in comparison to its position in the video frame 400. The plot 430 shows that most users still believe that the traffic entity 405 has a relatively low likelihood of crossing the street.

Figure 4C:
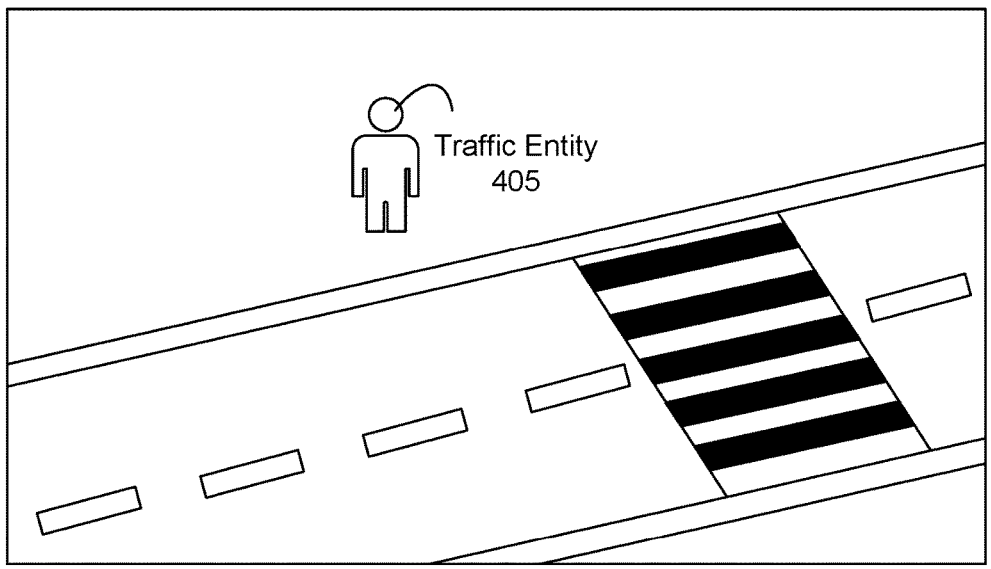
Figure 4C:
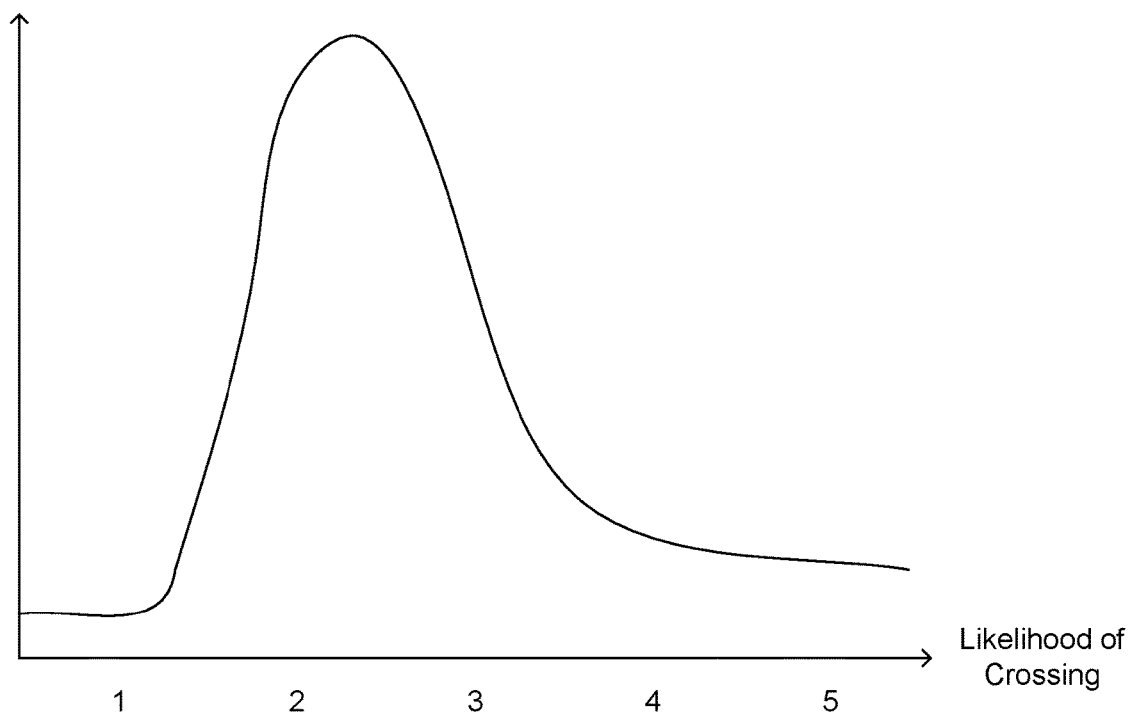

In FIG. 4C, users are presented the video frame 440, in which the traffic entity 405 moves again slightly in comparison to its position in the video frame 420. The plot 450 shows that more users believe that there is a likelihood of crossing.

Figure 4D:
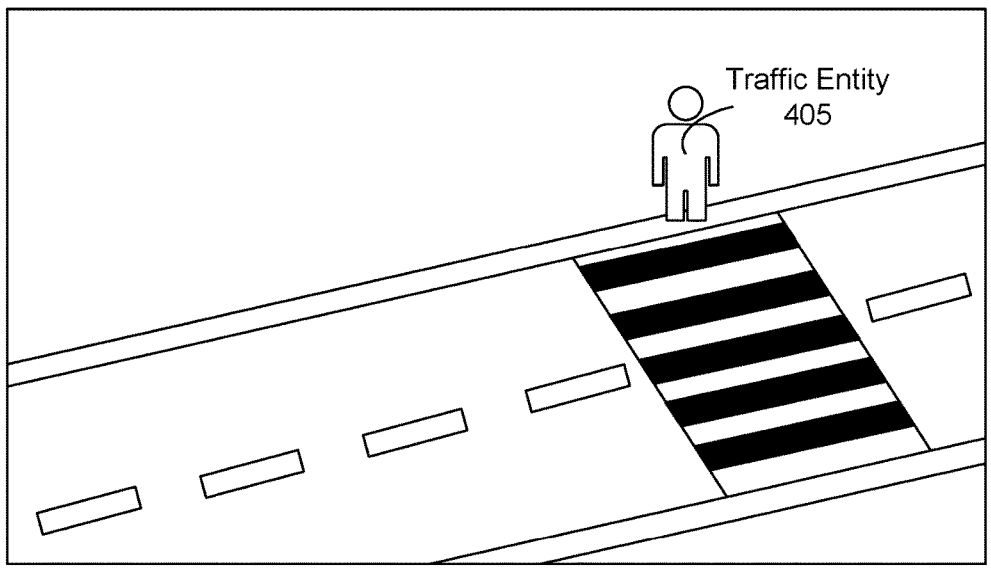
Figure 4D:
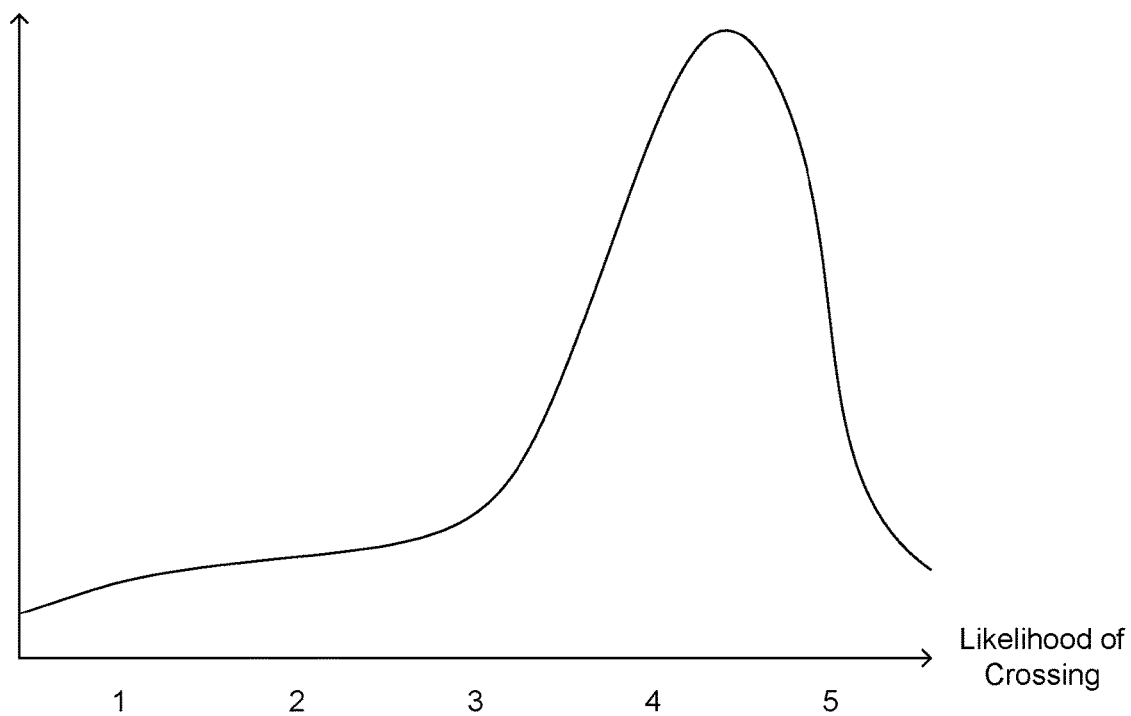

In. FIG. 4D, the video frame 460 shows the traffic entity 405 stepping onto a crosswalk. The plot 470 shows that users presented with the video frame 460 believe that there is a relatively high likelihood of the traffic entity 405 crossing the street.

The calculated attribute values for the video frames 400, 420, and 440 may be similar and/or may be within thresholds of each other, indicating that the statistical distribution of user responses to those video frames are similar. For the video frames 400, 420, and 440, this may indicate that most users believe that the traffic entity 405 is not very likely to cross the road.

In some embodiments, the video frames 400, 420, 440, and 460 may be sampled, such that only the video frames 400 and 440 are shown to the set of users. The calculated attribute value for the video frame 400 may be within a threshold of the attribute value for the video frame 440, given that the user responses are similar between the two video frames 400 and 440. The system may interpolate, as described by FIG. 3A, between the video frame 400's attribute value and the video frame 440's attribute value to generate a predicted attribute value, i.e., a predicted user distribution for the video frame 420 captured in between the video frames 400 and 440.

In contrast, suppose the user is presented with the video frame 400 and subsequently, the video frame 460. The system calculated attribute value for the video frame 460 may be greater than a threshold of the attribute value for the video frame 400, as evidenced by the difference in the plots of the statistical distribution of user responses. While the plot 410 shows that users believe that the traffic entity 405 is relatively unlikely to cross the road in the video frame 400, the plot 470 shows that users believe that the traffic entity 405 is more likely to cross the road in the video frame 460. Accordingly, the system may request users to provide input on another video frame captured in the time interval between the capturing of the video frames 440 and 460. The system uses the set of users' responses to determine attribute values for the video frame captured in between the video frames 440 and 460.

The interpolated and/or user based attribute values contribute to building a denser dataset of user responses on a traffic entity's state of mind. The dataset is input into a machine learning model that, in response to a video frame with a traffic entity, outputs a predicted distribution of user inputs about the traffic entity's state of mind.

Alternative Embodiments

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

It is to be understood that the figures and descriptions have been simplified to illustrate elements that are relevant for a clear understanding of the present invention, while eliminating, for the purpose of clarity, many other elements found in a typical online system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the various embodiments. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   receiving a sequence of video frames captured by a camera mounted on an autonomous vehicle;
   sampling the sequence of video frames to obtain a subset of video frames;
   annotating each of the subset of video frames obtained by sampling, each annotation specifying an attribute value describing a statistical distribution of user responses obtained by presenting the video frame to a plurality of users, each user response representing a likelihood of a state of mind represented by a hidden context for a traffic entity displayed in the video frame;
   identifying a pair of video frames from the subset of video frames, the pair of video frames comprising a first video frame and a second video frame, wherein a time of capture of the first video frame and a time of capture of the second video frame is separated by a first time interval;
   comparing a first attribute value associated with the first video frame and a second attribute value associated with the second video frame;
   responsive to the first attribute value being within a threshold of the second attribute value, annotating a third video frame from the sequence of video frames having a time of capture within the first time interval by interpolating using the first attribute value and the second attribute value;
   providing a training data set including the annotated subset of video frames and the third video frame for training a machine learning model, the machine learning model configured to receive an input video frame displaying a traffic entity and predict a statistical distribution of user responses representing the likelihood of the state of mind of the traffic entity displayed in the input video frame; and
   providing the trained machine learning model to the autonomous vehicle to assist with navigation in traffic.

2. The method of claim 1, further comprising:
   identifying a second pair of video frames from the subset of video frames, the second pair of video frames comprising a fourth video frame and a fifth video frame, wherein the time of capture of the fourth video frame and the time of capture of the fifth video frame is separated by a second time interval;
   comparing a fourth attribute value associated with the fourth video frame and a fifth attribute value associated with the fifth video frame; and responsive to the fourth attribute value being greater than the threshold of the fifth attribute value:
  identifying a sixth video frame from the sequence of video frames having a time of capture within the second time interval;
  sending the sixth video frame to a plurality of users; and
  annotating the sixth video frame based on responses from the plurality of users, the responses describing a hidden context associated with a traffic entity displayed in the sixth video frame.

3. The method of claim 2, wherein the annotated sixth video frame is included in the training data set.

4. The method of claim 1, wherein the state of mind of the traffic entity comprises an intention of the traffic entity to cross a path of the autonomous vehicle.

5. The method of claim 1, wherein the state of mind of the traffic entity further comprises a measure of awareness of the autonomous vehicle.

6. The method of claim 1, wherein an annotation of a video frame includes a set of parameters indicating a statistical distribution of the user responses provided by a set of users upon being presented with the video frame.

7. The method of claim 1, wherein interpolating between the first attribute value and the second attribute value is based on the time of capture of the third video frame within the first time interval.

8. A computer readable non-transitory storage medium storing instructions, the instructions when executed by a processor cause the processor to perform steps comprising:
  receiving a sequence of video frames captured by a camera mounted on an autonomous vehicle;
  sampling the sequence of video frames to obtain subset of video frames;
  annotating each of the subset of video frames obtained by sampling, each annotation specifying an attribute value describing a statistical distribution of user responses obtained by presenting the video frame to a plurality of users, each user response representing a likelihood of a state of mind represented by a hidden context for a traffic entity displayed in the video frame;
  identifying a pair of video frames from the subset of video frames, the pair of video frames comprising a first video frame and a second video frame, wherein a time of capture of the first video frame and a time of capture of the second video frame is separated by a first time interval;
  comparing a first attribute value associated with the first video frame and a second attribute value associated with the second video frame;
  responsive to the first attribute value being within a threshold of the second attribute value, annotating a third video frame from the sequence of video frames having a time of capture within the first time interval by interpolating using the first attribute value and the second attribute value;
  providing a training data set including the annotated subset of video frames and the third video frame for training a machine learning model, the machine learning model configured to receive an input video frame displaying a traffic entity and predict a statistical distribution of user responses representing the likelihood of the state of mind of the traffic entity displayed in the input video frame; and
  providing the trained machine learning model to the autonomous vehicle to assist with navigation in traffic.

9. The computer readable non-transitory storage medium of claim 8, wherein the instructions further cause the processor to perform steps comprising:
  identifying a second pair of video frames from the subset of video frames, the second pair of video frames comprising a fourth video frame and a fifth video frame, wherein the time of capture of the fourth video frame and the time of capture of the fifth video frame is separated by a second time interval;
  comparing a fourth attribute value associated with the fourth video frame and a fifth attribute value associated with the fifth video frame; and
  responsive to the fourth attribute value being greater than the threshold of the fifth attribute value:
    identifying a sixth video frame from the sequence of video frames having a time of capture within the second time interval;
    sending the sixth video frame to a plurality of users; and
    annotating the sixth video frame based on responses from the plurality of users, the responses describing a hidden context associated with a traffic entity displayed in the sixth video frame.

10. The computer readable non-transitory storage medium of claim 9, wherein the annotated sixth video frame is included in the training data set.

11. The computer readable non-transitory storage medium of claim 9, wherein the state of mind of the traffic entity comprises an intention of the traffic entity to cross a path of the autonomous vehicle.

12. The computer readable non-transitory storage medium of claim 9, wherein the state of mind of the traffic entity further comprises a measure of awareness of the autonomous vehicle.

13. The computer readable non-transitory storage medium of claim 8, wherein an annotation of a video frame includes a set of parameters indicating a statistical distribution of the user responses provided by a set of users upon being presented with the video frame.

14. The computer readable non-transitory storage medium of claim 8, wherein interpolating between the first attribute value and the second attribute value is based on the time of capture of the third video frame within the first time interval.

15. A computer implemented system comprising:
  a computer processor; and
  a computer readable non-transitory storage medium storing instructions thereon, the instructions when executed by a processor cause the processor to perform steps of:
    receiving a sequence of video frames captured by a camera mounted on an autonomous vehicle;
    sampling the sequence of video frames to obtain subset of video frames;
    annotating each of the subset of video frames obtained by sampling, each annotation specifying an attribute value describing a statistical distribution of user responses obtained by presenting the video frame to a plurality of users, each user response representing a likelihood of a state of mind represented by a hidden context for a traffic entity displayed in the video frame;
    identifying a pair of video frames from the subset of video frames, the pair of video frames comprising a first video frame and a second video frame, wherein a time of capture of the first video frame and a time of capture of the second video frame is separated by a first time interval;

comparing a first attribute value associated with the first video frame and a second attribute value associated with the second video frame;

responsive to the first attribute value being within a threshold of the second attribute value, annotating a third video frame from the sequence of video frames having a time of capture within the first time interval by interpolating using the first attribute value and the second attribute value;

providing a training data set including the annotated subset of video frames and the third video frame for training a machine learning model, the machine learning model configured to receive an input video frame displaying a traffic entity and predict a statistical distribution of user responses representing the likelihood of the state of mind of the traffic entity displayed in the input video frame; and providing the trained machine learning model to the autonomous vehicle to assist with navigation in traffic.

16. The computer system of claim 15, wherein the instructions further cause the processor to perform steps comprising:

identifying a second pair of video frames from the subset of video frames, the second pair of video frames comprising a fourth video frame and a fifth video frame, wherein the time of capture of the fourth video frame and the time of capture of the fifth video frame is separated by a second time interval;

comparing a fourth attribute value associated with the fourth video frame and a fifth attribute value associated with the fifth video frame; and responsive to the fourth attribute value being greater than the threshold of the fifth attribute value:

identifying a sixth video frame from the sequence of video frames having a time of capture within the second time interval;

sending the sixth video frame to a plurality of users; and annotating the sixth video frame based on responses from the plurality of users, the responses describing a hidden context associated with a traffic entity displayed in the sixth video frame.

17. The computer system of claim 16, wherein the annotated sixth video frame is included in the training data set.

18. The computer system of claim 15, wherein interpolating between the first attribute value and the second attribute value is based on the time of capture of the third video frame within the first time interval.

19. The computer system of claim 15, wherein the state of mind of the traffic entity comprises an intention of the traffic entity to cross a path of the autonomous vehicle.

20. The computer system of claim 15, wherein the state of mind of the traffic entity further comprises a measure of awareness of the autonomous vehicle.

* * * * *

UNITED STATES PATENT AND TRADEMARK OFFICE
CERTIFICATE OF CORRECTION

PATENT NO. : 12,012,118 B2
APPLICATION NO. : 17/081202
DATED : June 18, 2024
INVENTOR(S) : Avery Wagner Faller It is certified that error appears in the above-identified patent and that said Letters Patent is hereby corrected as shown below:

In the Claims

In Column 14, in Claim 15, Line 45, after "computer" delete "implemented".

Signed and Sealed this
Twenty-fifth Day of February, 2025

Coke Morgan Stewart
*Acting Director of the United States Patent and Trademark Office*